United States Patent
Horodezky et al.

(10) Patent No.: US 8,818,363 B2
(45) Date of Patent: Aug. 26, 2014

(54) METHODS AND APPARATUS FOR SIGNAL SCANNING AND ACQUISITION FOR MULTIPLE-AIR-INTERFACE DEVICES

(75) Inventors: Samuel Jacob Horodezky, San Diego, CA (US); James Lionel Panian, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 763 days.

(21) Appl. No.: 12/648,177

(22) Filed: Dec. 28, 2009

(65) Prior Publication Data
US 2010/0167731 A1 Jul. 1, 2010

Related U.S. Application Data (60) Provisional application No. 61/141,370, filed on Dec. 30, 2008.

(51) Int. Cl.
*H04W 4/00* (2009.01)

(52) U.S. Cl.
USPC .............. 455/434; 455/432.3; 455/432.1; 455/435.2

(58) Field of Classification Search
CPC ..... H04W 48/16; H04W 88/06; H04W 48/18; H04W 36/0083; H04W 16/14; H04W 28/18; H04W 36/14; H04W 84/042; H04W 84/12; H04W 88/12; H04W 92/02; H04W 36/08; H04W 36/04; H04W 48/14
USPC .................. 455/434, 435.2, 151.1
See application file for complete search history.

(56) References Cited

U.S. PATENT DOCUMENTS

| | | | |
|---|---|---|---|
| 6,529,491 B1 * | 3/2003 | Chang et al. | 370/335 |
| 8,045,980 B2 * | 10/2011 | Buckley et al. | 455/434 |
| 2004/0076130 A1 | 4/2004 | Uchida et al. | |
| 2006/0094427 A1 | 5/2006 | Buckley et al. | |
| 2007/0211669 A1 | 9/2007 | Umatt et al. | |
| 2007/0226374 A1 * | 9/2007 | Quarterman et al. | 709/250 |

FOREIGN PATENT DOCUMENTS

| | | |
|---|---|---|
| EP | 1885141 | 2/2008 |
| JP | 2003500910 A | 1/2003 |
| JP | 2004023391 A | 1/2004 |
| JP | 2007511141 A | 4/2007 |
| JP | 2008519473 A | 6/2008 |
| WO | WO-0070901 A1 | 11/2000 |
| WO | WO-2005048632 A1 | 5/2005 |
| WO | 2006053420 A1 | 5/2006 |
| WO | WO-2007103991 A2 | 9/2007 |

OTHER PUBLICATIONS

Written Opinion—PCT/US2009/069726—ISA/EPO—Jan. 4, 2010.
Taiwan Search Report—TW098145888—TIPO—Jan. 2, 2013.
International Search Report—PCT/US2009/069726—International Search Authority, European Patent Office, Jan. 4, 2010.

\* cited by examiner

*Primary Examiner* — Kathy Wang-Hurst
(74) *Attorney, Agent, or Firm* — Stanton Braden

(57) ABSTRACT

Methods and apparatus for signal scanning and acquisition for multiple-air-interface devices are discussed. In particular, scanning of a location for signals from one or more local service providers is carried out, wherein scanning is operable to detect signals based on at least a first air interface and a second air interface, such as CDMA and UMTS, respectively. A list of local service providers detected from the scanning is assembled to allow a user to select a connection to at a local service provider from the list. Thus, a user is afforded the ability to see all service provider signals in the location, for all bands and air-interfaces supported by the modem on a user's multiple-air-interface device. The user may therefore acquire connection more easily without having any prior knowledge about the area or its service providers, and regardless of the type of air interface originating the local signals.

36 Claims, 8 Drawing Sheets

METHODS AND APPARATUS FOR SIGNAL SCANNING AND ACQUISITION FOR MULTIPLE-AIR-INTERFACE DEVICES

CLAIM OF PRIORITY UNDER 35 U.S.C. §119

The present Application for Patent claims priority to Provisional Application No. 61/141,370 entitled "AUTOSCAN SIGNAL ACQUISITION FOR DUAL-AIR-INTERFACE DEVICES" filed Dec. 30, 2008, and assigned to the assignee hereof and hereby expressly incorporated by reference herein.

BACKGROUND

1. Field

The present invention relates generally to wireless communications, and more specifically to signal scanning and acquisition for multiple-air-interface devices.

2. Background

Wireless communication users often require wireless communication access in various and random environments. For example, a wireless user may walk off an airplane anywhere in the world and desire a connection to a local signal. Presently, however, there are a number of limitations to this functionality. With a dual-air-interface device capable of communication with Global System for Mobile communications (GSM) or Universal Mobile Telecommunications System (UMTS) and code division multiple access (CDMA) technologies, for example, acquisition of a new GSM signal would require an appropriate subscriber identity module (SIM), which the user may not have. Additionally, CDMA devices typically do not afford scanning of multiple CDMA networks available in an area, so if the user's normal CDMA provider is not available, the user will be unaware of other locally available CDMA networks. Thus, particularly in dual or multi-mode user devices, the ability to easily connect to or acquire a local signal is limited. There is therefore a need in the art for signal scanning in a user device that scans multiple air interfaces in a location to afford a user easier connection to local signals regardless of the type of air interface originating the local signals.

SUMMARY

According to an aspect, a method of signal scanning for connection to a local service provider is disclosed. The method includes scanning a location for signals from one or more local service providers, wherein scanning is operable to detect signals based on at least a first air interface and signals based on a second air interface. Further, the method includes assembling a list of local service providers detected from the scanning to allow a selection of a connection to at least one of the local service providers from the list.

In another aspect, an apparatus for signal scanning for connection to a local service provider is taught. The apparatus includes at least one processor configured to scan a location for signals from one or more local service providers, wherein scanning is operable to detect signals based on at least a first air interface and signals based on a second air interface. The at least one processor is also configured to assemble a list of local service providers detected from the scanning to allow a selection of a connection to at least one of the local service providers from the list. Moreover, the apparatus includes a memory coupled to the at least one processor.

In yet another aspect, an apparatus for signal scanning for connection to a local service provider is disclosed. The apparatus includes means for scanning a location for signals from one or more local service providers, wherein scanning is operable to detect signals based on at least a first air interface and signals based on a second air interface. Additionally, the apparatus includes means for assembling a list of local service providers detected from the scanning to allow a selection of a connection to at least one of the local service providers from the list.

In still one more aspect, a computer program product, comprising computer-readable medium is disclosed. The computer-readable medium includes code for causing a computer to scan a location for signals from one or more local service providers for connection of a user device to a local service provider, wherein scanning is operable to detect signals based on at least a first air interface and signals based on a second air interface. Also included is code for causing a computer to assemble a list of local service providers detected from the scanning to allow a selection of a connection to at least one of the local service providers from the list.

DETAILED DESCRIPTION

The word "exemplary" is used herein to mean "serving as an example, instance, or illustration." Any embodiment or aspect described herein as "exemplary" is not necessarily to be construed as preferred or advantageous over other embodiments or aspects.

The presently disclosed methods and apparatus provide signal scanning in a user device that scans multiple air interfaces to allow users a more immediate connection to a carrier regardless of location. Specifically, a wireless user may scan a location for available Service Providers or carriers from multiple air interfaces. Accordingly, the device is configured to scan one air interface first, then the second, and so on. In one particular aspect, CDMA and UMTS channels may be searched to present the user with all signals found in a location, allowing the user to acquire a Service Plan and connect immediately without roaming.

It is first noted that the techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems"

are often used interchangeably. Further, the terms "service provider" or "carrier" may be synonymous with "network" in that a particular provider or carrier supplies the network. Additionally, the term "air-interface" is used to denote a radio technology. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2) and may include improvements such as Ultra Mobile Broadband (UMB). These various radio technologies and standards are known in the art. For clarity, certain aspects of the techniques are described below for GSM or CDMA terminology is used in much of the description below.

Figure 1:
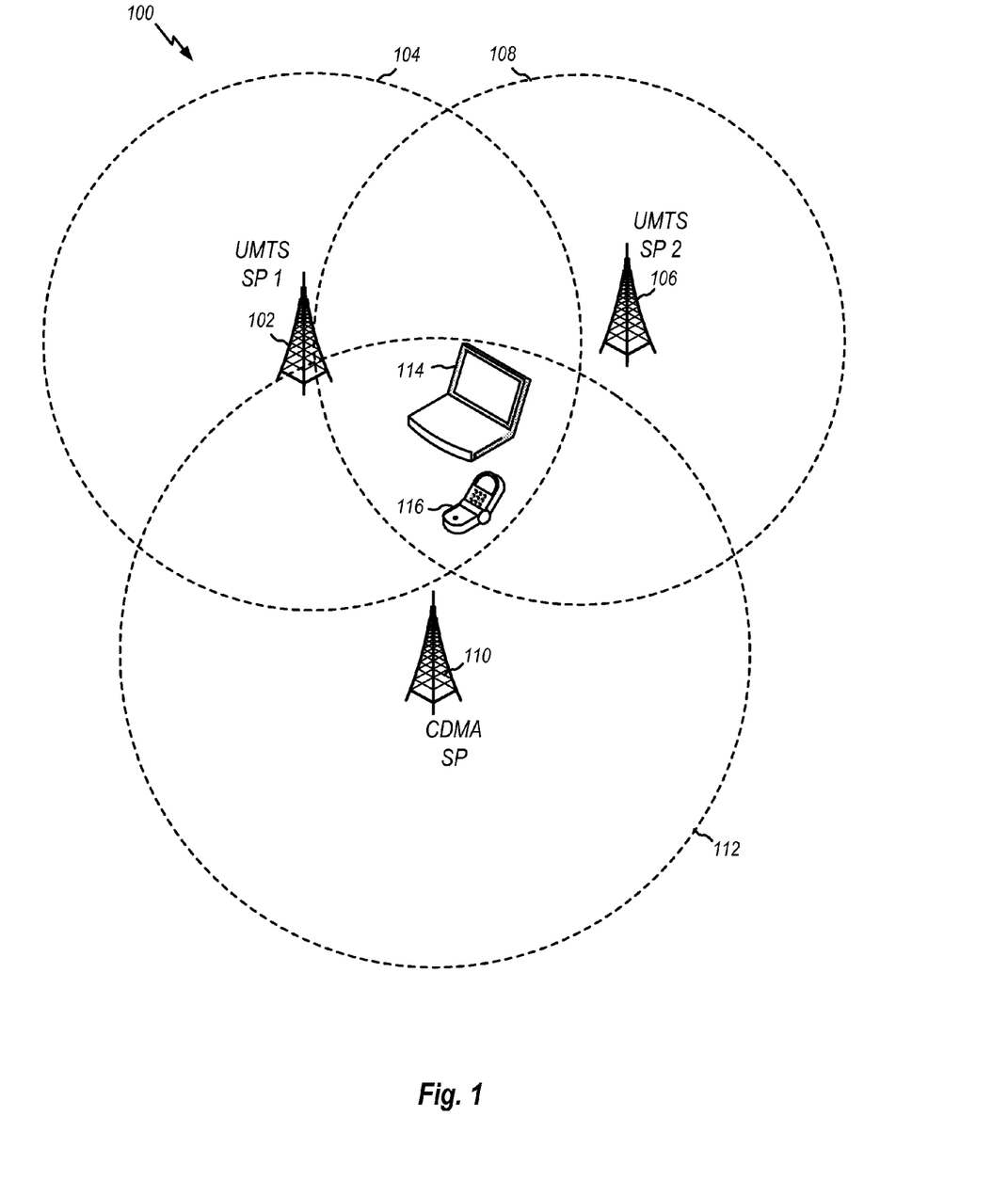
FIG. 1 illustrates an example of a location having multiple air interfaces from multiple service providers.

FIG. 1 illustrates an example of a location 100 having multiple air interfaces from multiple available carriers or Service Providers in which the present methods and apparatus might be utilized. A first base station 102 (or eNodeB, Access Point, Femtocell, as other examples of terms from different contemplated technologies or air interfaces) effects a coverage area 104 for service from a first service provider (SP) using a first air interface (e.g., UMTS or GSM). In the example, a second base station 106 is also present in the location providing coverage (area 108) for a second service provider also using the first air interface (i.e., UMTS). Additionally, the illustrated location 100 may include another base station 110 that effects a coverage area 112 for yet another SP utilizing a second air interface such as CDMA. As illustrated, user devices 114 and 116 may be located in an area that is covered by all three illustrated service providers, where two or more providers may utilize the same air interface technology (e.g., 102, 106). Accordingly, the presently disclosed methodologies allow a user of the devices 114 or 116 to scan for these available service providers spanning multiple air interface technologies and select which provider from among the scan results to connect.

Figure 2:
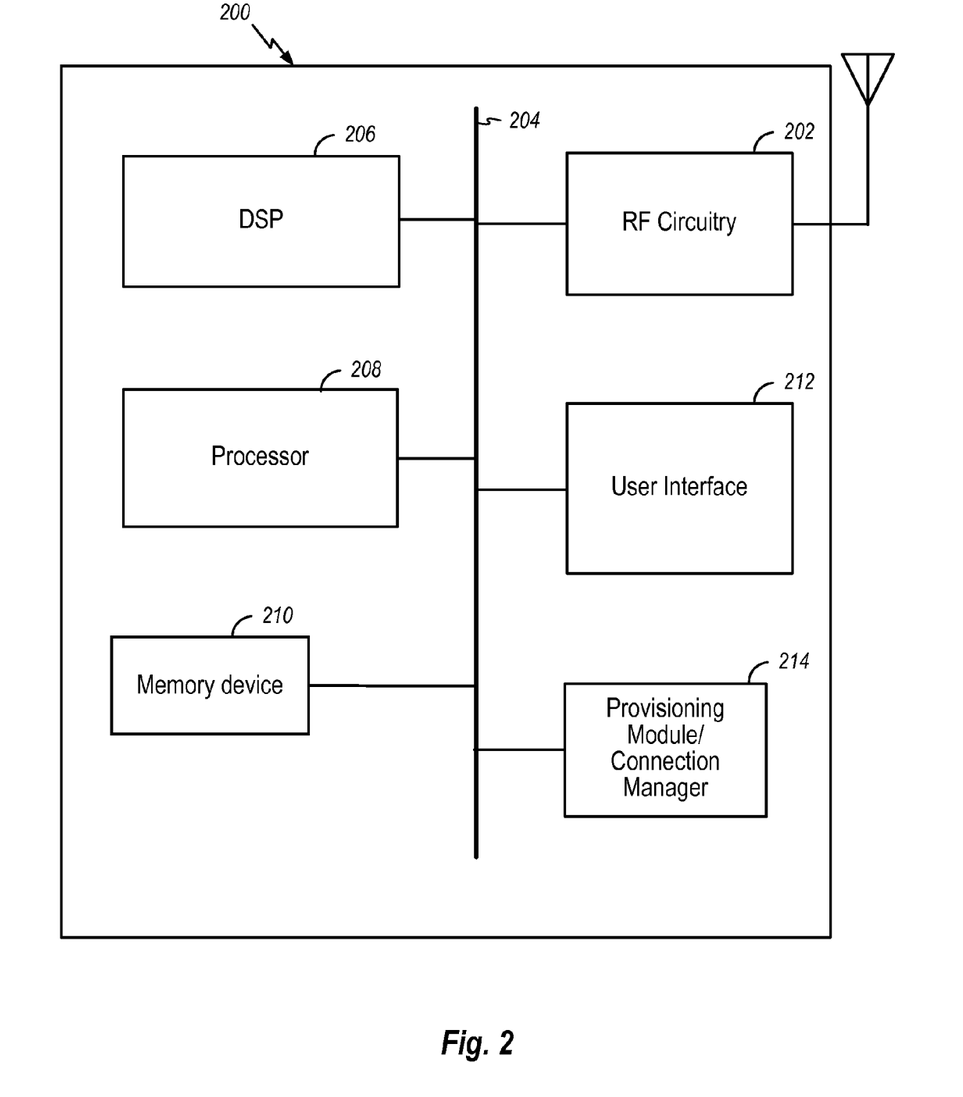
FIG. 2 illustrates a diagram of a communication device configured to scan for signals from multiple air interfaces.

FIG. 2 illustrates an exemplary diagram of a communication device 200 configured to scan for signals from multiple air interfaces, such as the devices 114, 116 in the location illustrated by FIG. 1. Device 200, which may be any device, or portion thereof, that is capable of wirelessly connecting to a network via an air interface, such as UMTS, CDMA, LTE, Wi-Fi, WiMax, etc. Examples may include, but are not limited to, a laptop/notebook computer, a netbook, a PDA, mobile terminal, access terminal (AT), a virtual computer terminal, user equipment (UE), or a cell phone.

The device may include an RF circuitry 202 that is configured to receive signals via one or more air interfaces. In one example, the RF circuitry 202 may be configured to receive signals via the dual air interfaces UMTS and CDMA. It is noted here that a communication bus 204 is illustrated merely to indicate that block, modules, and circuitry within device 200 are communicatively coupled to afford communication of data and information there between. It is also noted that the various blocks, modules, and circuitry may be incorporated into a single platform or chip, or separately in various degrees as illustrated in FIG. 2.

Device 200 also includes a digital signal processor (DSP) 206 or equivalent apparatus to process signals received by the RF circuitry 202, such as when scanning for signals from one or more air interfaces. It is contemplated, however, that the RF circuitry 202 could be also configured to perform limited scanning or detection for air interfaces without the DSP 206, or with limited assistance from the DSP 206. Additionally, RF circuitry 202 and DSP 206, in part, comprise a modem that is used for transmitting/receiving and processing signals once the device is connected to a service provider or carrier.

Device 200 also may include a general processor 208 to execute an algorithm directing the scanning of signals from the one or more air interfaces with RF circuitry 202 and DSP 206. The specific methodologies that may be used for scanning will be discussed in further detail later. Also included is a memory device 210 used to store instructions executable by the processor 208 to implement scanning and other functions. The device 200 also includes a user interface 212 that outputs information to the user and receives user inputs, including inputs pertaining to operation of scanning for air interfaces in a location. Inputs from interface 212 may be stored in memory 210.

Finally, device 200 may include a provisioning module and connection manager module 214 to perform specific functions such as assisting in adding an account when connecting to new service provider (i.e., provisioning), and managing connection of the device 200 to the service provider, as just a couple examples. It is noted that although shown as a separate module 214, module 214 may be implemented as software running on a processor (e.g., processor 208), firmware, hardware, or any combination thereof. In a particular implementation for a device using Gobi™ offered by Qualcomm Inc., the connection manager portion of 214 may be software that normally runs on one or more processors and handles a user's ongoing needs with respect to Gobi™ (e.g., turning Gobi™ on and off, and connecting or disconnecting from mobile broadband service). Further, the Provisioning part of module 214 may also be software that is loaded to a processor when the user needs to add an account to the connection manager portion, either on the first use of Gobi™ or upon subsequent provisioning of more mobile broadband accounts.

Figure 3:
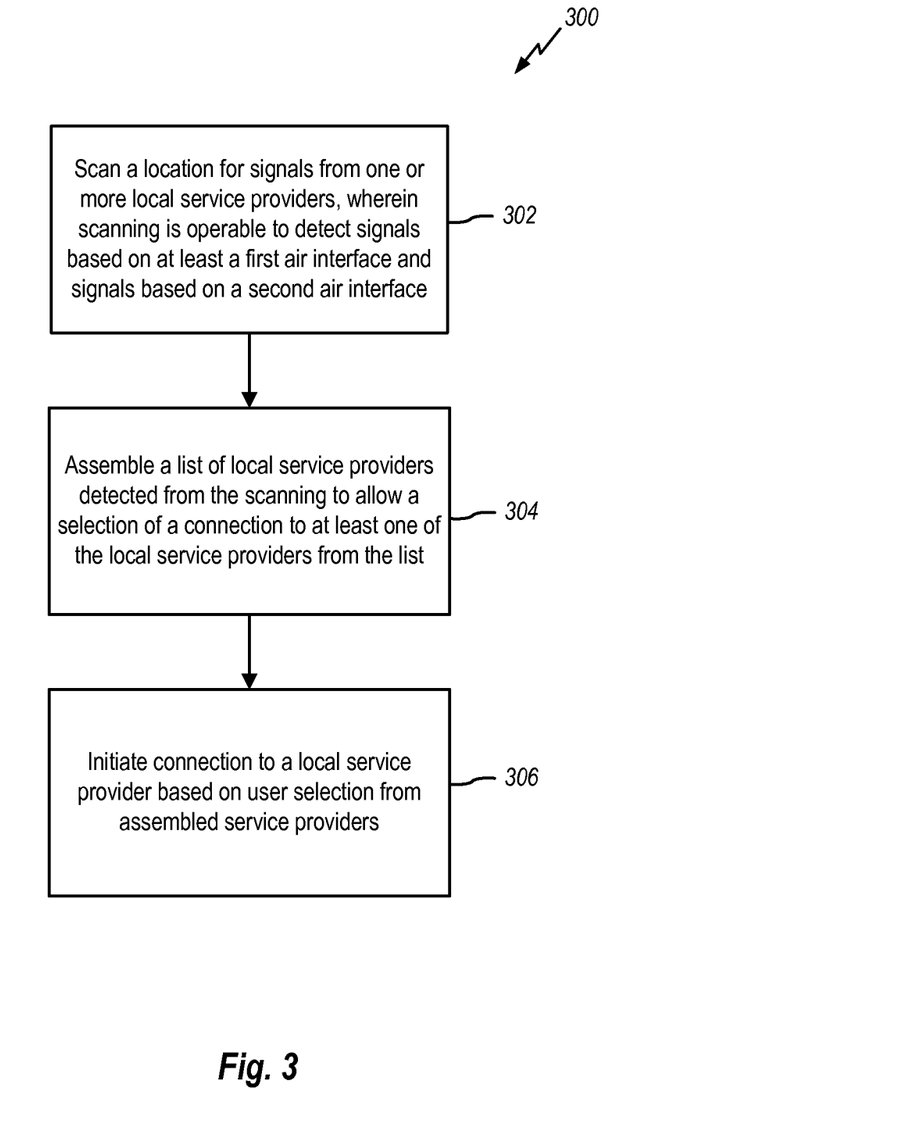
FIG. 3 is a flow chart for an exemplary method for scanning for signals from multiple air interfaces in a particular location.

As mentioned above, device 200 may be configured to scan for multiple air interfaces, as well as scan for multiple service providers operating according to each of the air interfaces. In operation, FIG. 3 shows a flow chart of an exemplary method 300 executable by device 200 or a similar device for scanning for signals from multiple air interfaces in a particular location. It is noted that in an aspect, the methodology 300 includes knowledge of the location where the device performing scanning is located. This knowledge may be derived simply by input from a user of the device. Alternatively, a GPS module in the device could be provided to automatically obtain location information.

As illustrated, method 300 includes scanning a location for signals from one or more local service providers, wherein scanning is operable to detect signals based on at least a first air interface and signals based on a second air interface as indicated in block 302. Using the example of FIG. 2, the process in block 302 may be implemented by software running on a processor 208 directing the RF circuitry 202 to receive signals from one or more air interfaces, DSP 206 if necessary, as well as firmware stored in memory and executable by a processor (e.g., processor 208) to determine detect SIMs or determine a scanning order of air interface signals.

After scanning, method 300 includes assembling a list of detected local service providers resulting from the scanning to allow a selection of a connection to at least one of the local service providers in the list as illustrated by block 304. The process of block 304 may include assembling or listing those service providers detected, but may also include filtering to remove service providers from the list that were previously rejected by a user of the device executing method 300 or service providers for which the user does not have a SIM in the case of GSM air-interfaces.

After the available service provider list has been assembled, connection may be initiated with a local service provider based on a user selection from assembled list of service providers as indicated in block 306. In an alternative, selection of a service provider in the list could be performed automatically based on previously entered user preference for particular service providers. In an aspect, connection may be accomplished through the direction or assistance of module 214 to provide connection instruction to a user based on whether a CDMA network is known from a stored database of networks or providers. Additionally, instructions may be provided to a user if an installed SIM is not valid for a selected GSM/UMTS network.

In another aspect, method 300 allows a user to see all Service Provider signals in a location for all bands and air-interfaces supported by the RF modem (e.g., RF circuitry 202 and DSP 206) in the user's device. The user may therefore acquire a service plan without having any prior knowledge about the area or its Service Providers.

Figure 4:
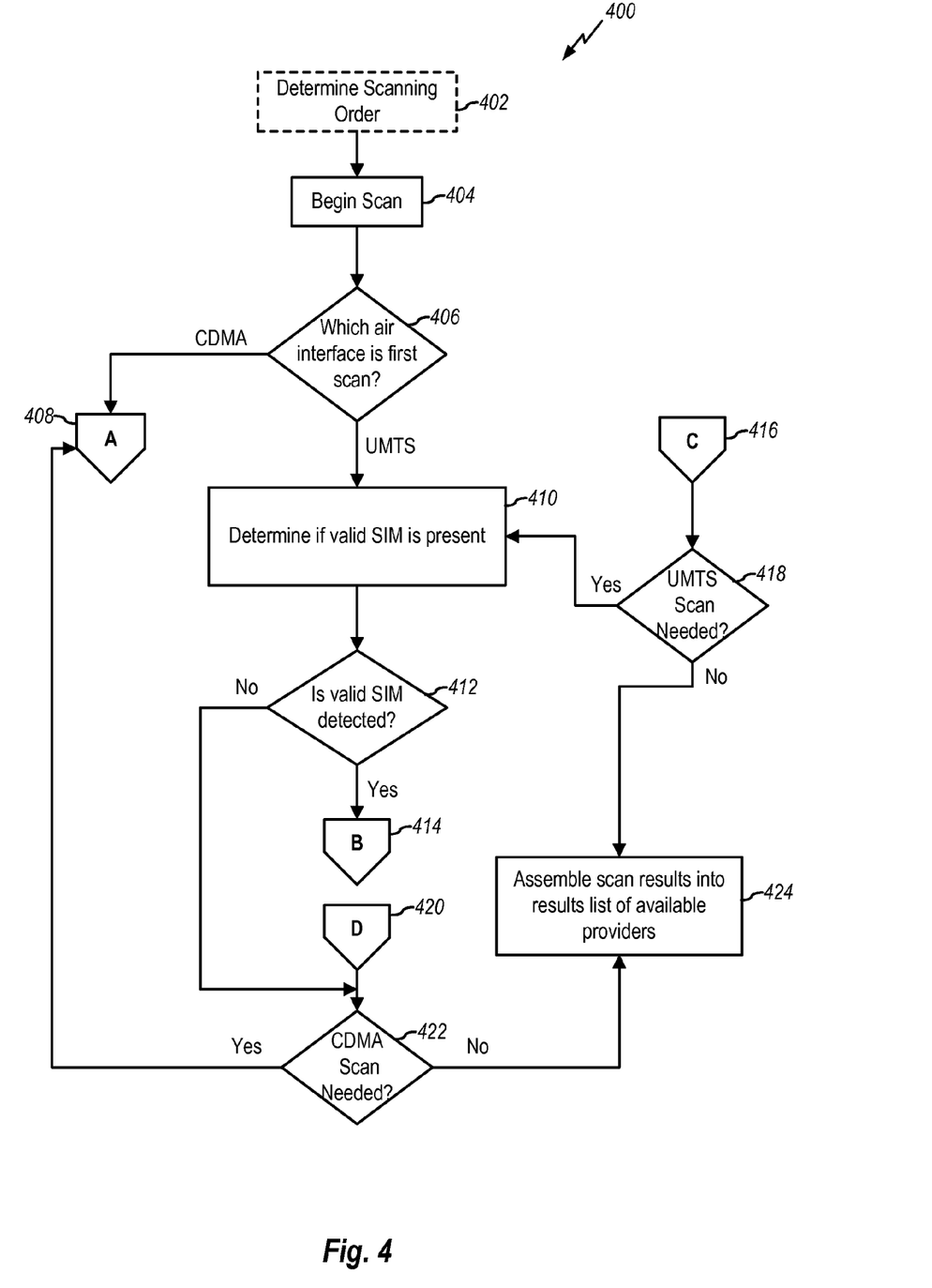
FIG. 4 illustrates a flow chart of a portion of another exemplary method of scanning for signal acquisition for dual-air-interface devices.

FIG. 4 illustrates a flow chart of a portion of another exemplary method 400 of scanning for signal acquisition for dual-air-interface devices, such as devices having capabilities to receive CDMA and UMTS in particular. Block 402 illustrates an alternative process whereby a scanning order may be first determined. In particular, the process may involve applying a set of filters to determine the order of scanning. For example, filter rules could include preclusion of a search for UMTS signals if there is no SIM, or if the region has no CDMA carriers, do not search for CDMA signals. Although not shown, the prefatory processes of method 400 may also include determining a present location. Location determination may be effected through any number of methods, including, but not limited to, a user entering a present location or a GPS signal. Additionally, location determination may be effected through other inputs such as an IP address to location mapping, or a wireless local area network (WLAN) location. In another aspect, a provisioning module in a user device may use a location application program interface (API), for example, that utilizes one or more of a variety of sources including user input, GPS signals, IP address to location mapping, or WLAN location. Known such APIs are offered by the operating system that uses location input from the variety of sources. Additionally, a user may optionally specify Service Providers from a pre-stored list that the user is interested in viewing. Furthermore, a database may be provided that lists available carriers based on the particular location information, allowing the list of carriers to be limited to those known in the region based on a correlation of the database information of carriers and the known present location. In another aspect, an OEM may provide an automatic filter that would affect either the scanning order, or the results that are returned.

The scanning process is initiated at block 404, whereupon flow proceeds to decision block 406 to determined which air interface is to be scanned first. In the example of FIG. 4, dual air interfaces are search, and the choice is between UMTS and CDMA. Of course one skilled in the art will appreciate that this is merely exemplary and that the methodology may be applied to other radio technologies and also to more than just two air interfaces. If the first selection is CDMA, flow proceeds to "A" (block 408) to initiate CDMA scanning, which will be discussed in connection with the continuation of method 400 illustrated in FIG. 5.

Alternatively if the first air interface to be searched is UMTS, flow proceeds to block 410 to check if a valid SIM is present since UMTS or GSM systems require a SIM. In an further aspect, the process of block 410 might include some appropriate firmware be loaded such as in device 200 if necessary, and a determination made whether a valid SIM is present in the device as illustrated by decision block 412. If a valid SIM is detected, flow proceeds to "B" (block 414) to initiate UMTS/GSM scanning, which will be discussed in connection with the continuation of method 400 illustrated in FIG. 6. Otherwise, if a SIM is not present, flow may proceed to block 422 to determine whether CDMA scanning is needed. For example, a user may be in a location such as Europe where there are no CDMA carriers available. Accordingly, the decision of block 422 would be answered in the negative, since there would be no need to scan for CDMA networks.

Figure 5:
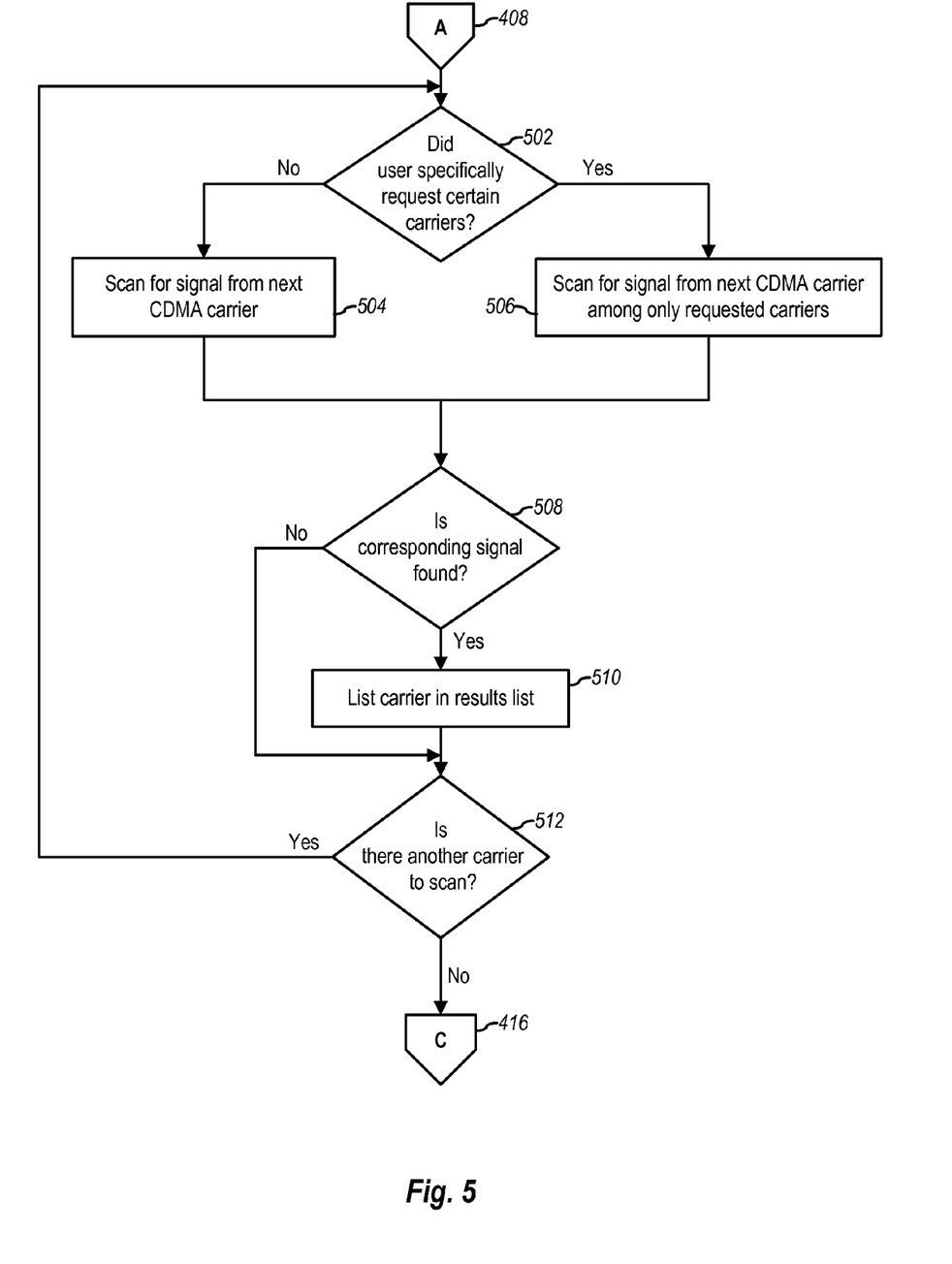
FIG. 5 illustrates a flow chart of a continued portion of the exemplary method of FIG. 4.

Return from the process of CDMA scanning shown by FIG. 5 is illustrated at "C" (block 416), after which a determination may be made whether UMTS scanning is needed at decision block 418. If so, flow proceeds to block 410 for determination of a valid SIM. Otherwise, flow proceeds to block 420 where the detected signals from one or both of the air interfaces are assembled into a list of available service providers that may be output to the user.

Figure 6:
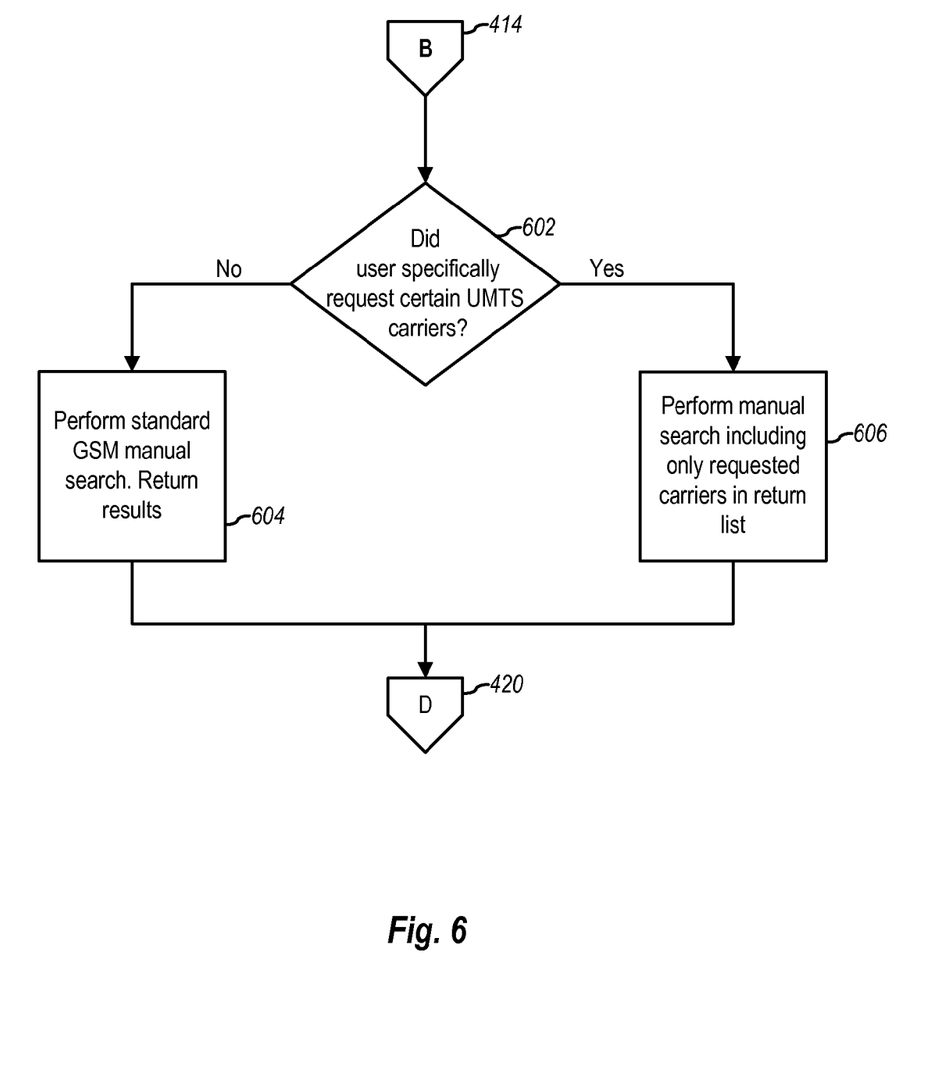
FIG. 6 illustrates a flow chart of another continued portion of the exemplary method of FIG. 4.

"D" (block 422) illustrates return from the process of UMTS scanning shown by FIG. 6, from which flow proceeds to decision block 424 to determine if CDMA scanning is needed. If so, flow proceeds to block 408, otherwise flow proceeds to block 420.

At the end of a disclosed searching process, combined CDMA-UMTS results are presented to the user. It is a requirement for CDMA scanning that the device have information in a database about every CDMA Service Provider that can be scanned. In one embodiment, a user sees all Service Provider signals in the area, for all bands and air-interfaces supported by the modem on the user's device. The user could therefore acquire a service plan without having any prior knowledge about the area or its Service Providers.

FIG. 5 illustrates a flow chart of a continued portion of the exemplary method of FIG. 4 that effects CDMA scanning. The scanning procedure in FIG. 5 starts with a determination whether the user specifically has requested certain carriers or service providers as shown with decision block 502. If no, then flow proceeds to block 504 where a scan for a next CDMA carrier or service provider is performed to see if a signal is present from that carrier. In one exemplary implementation, block 504 may further consist of loading information concerning the available CDMA carriers that is operable for detecting signals from those networks. In a particular example, a CDMA firmware for the region may be loaded, which involves querying a database or memory (e.g., memory 210) with stored information about Service Providers in the area (based on a correlation with location information). Thus, in this example, the next available or sequentially stored carrier in the database is loaded and a corresponding search by the modem for that particular signal performed. On the other hand if particular carriers have been requested, the process of block 506, while performing the same functionality as block 504, limits the scan to only those certain selected carriers from the database.

If the particular loaded CDMA carrier is found, as determined in the query of block 508, the carrier is placed into the assembled results list as indicated in block 510 and flow proceeds to block 512 to determine if further carriers are to be scanned. On the other hand, if a CDMA carrier is not found at block 508, the process of block 510 is skipped and flow proceeds directly to decision block 512. If not all CDMA service providers or carriers have been scanned, flow proceeds back to blocks 502, and 504 or 506 to scan for the next available CDMA carrier by the modem. After all CDMA service providers have been scanned, flow proceeds to "C" (block 416) to return to method 400 in FIG. 4.

FIG. 6 illustrates a flow chart of another continued portion of the exemplary method of FIG. 4 that effects UMTS/GSM air-interface scanning. From "B" (block 414) flow proceeds to decision block 602 to determine whether the user has specifically requested certain UMTS carriers or service providers. If not, a standard GSM manual search is conducted as indicated in block 604. It is noted that this example employs a manual search feature of GSM devices that allows the device to view all networks in the area, even if those networks are blocked by the current SIM (e.g., manual selection mode as specified in the 3rd Generation Partnership Project (3GPP) Technical Specification TS 22.011, Release 7). The scan results are then returned to "D" and method 400 for incorporation in the results list (block 420).

Alternatively, if the user specifically selects certain UMTS carries to search, flow proceeds from block 602 to block 606 where only the requested carriers are searched or scanned for during the GSM manual search. The search results are then returned to "D" and method 400 for incorporation in the results list (block 420).

Figure 7:
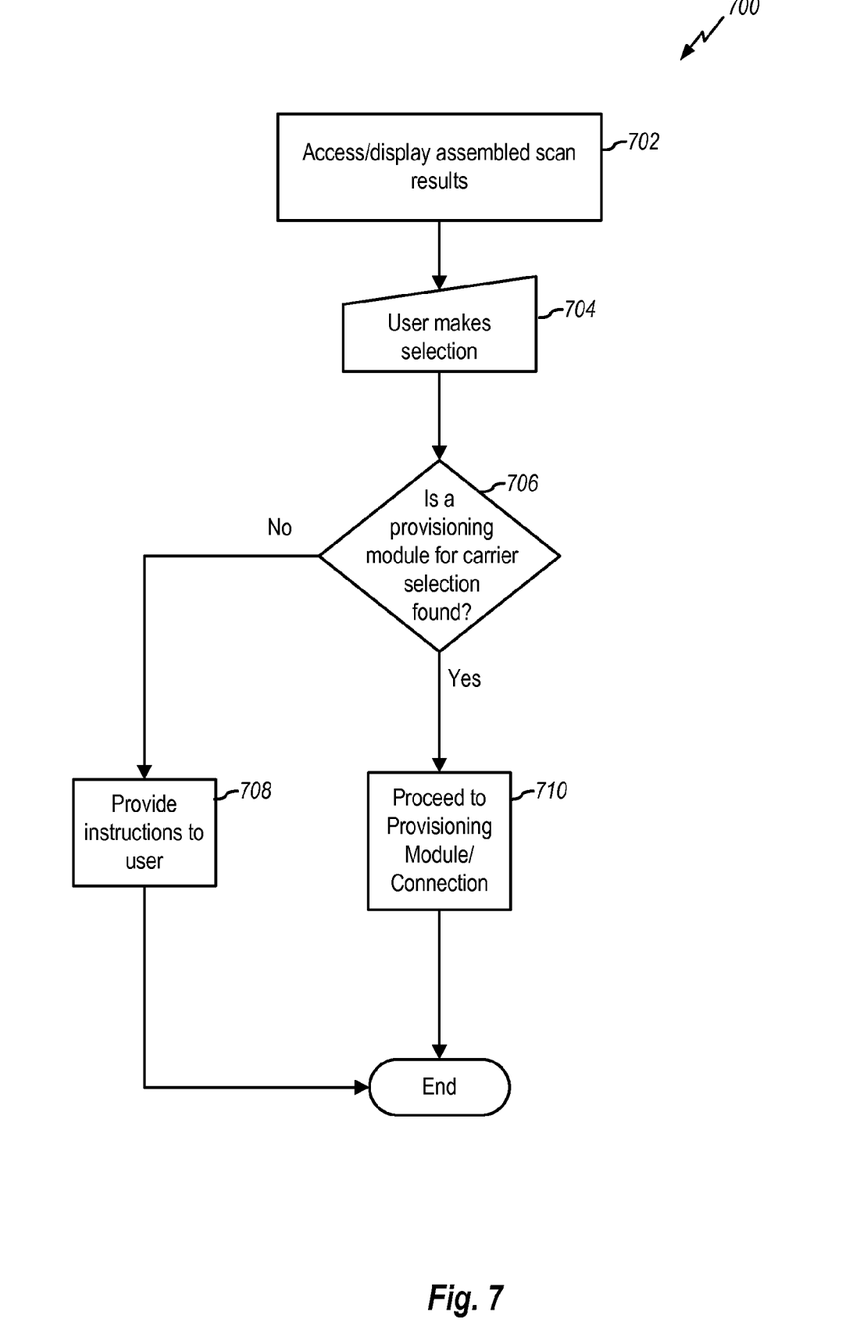
FIG. 7 is a flow chart for an exemplary method for selection of a carrier after execution of the scanning method illustrated in FIGS. 4-6.

After the search or scan results are assembled in a results list in block 420, the user may be presented with the available service providers from both UMTS and CDMA air interfaces, allowing the user to select a particular carrier. FIG. 7 is a flow chart for an exemplary method 700 for selection of a carrier after execution of the scanning method illustrated in FIGS. 4-6. The assembled scan results list of service providers (e.g., the combined CDMA-UMTS results) is accessed by or displayed to a user of a device as shown in block 702. The user then selects a service provider as indicated in input block 704.

Flow then proceeds to decision block 706, where a determination is made whether or not a provisioning module for the particular carrier selected is found. It is noted here that provisioning modules for both UMTS and CDMA carriers provide over the air (OTA) customer account provisioning. If the selection is not found, flow proceeds to block 708 where instructions are provided to assist the user in obtaining a network connection. Alternatively at block 706, if the selected carrier is found, flow proceeds to a block 710 for provisioning and connection via module 214 as one example, after which the selection method 700 terminates.

It is noted that in UMTS systems not including provisioning over the air, an optional implementation of process 706 could be checking whether an installed SIM differs from the selected UMTS carrier if the user selection is a UMTS carrier. If the selected UMTS carrier differs from a SIM installed in the user's device, flow would proceed to block 708 for further instructions, such as which SIM to insert, reselection of another service provider or air-interface from the results list, etc. Also, if the SIM matches, then the connection may proceed with the installed SIM.

According to a particular aspect, it is further noted that if a CDMA carrier is selected in block 704, and the CDMA carrier is not found during the interrogation process of block 706, flow proceeds to block 708 to provide user instructions to assist the user in obtaining either the CDMA carrier data (e.g., a serial loading from memory within the device to the modem, or loading from an external source) for use by the provisioning module, reselection of another carrier in the same or a different air-interface, etc. In another aspect, it is noted that for some implementations of presently disclosed apparatus and methods, because of memory limitations in a modem, the CDMA information is stored external to modem connecting to the air-interface, and is then serially loaded into the modem. If there is enough storage present to be able to access all the firmware variants, however, such serial loading would of course not be necessary.

It is further noted that presently the ability to store and access information about various carriers is only feasible with CDMA signals that are found. However, it is contemplated that this aspect of the presently disclosed methods and apparatus could apply for UMTS/GSM having non-physical security measures such as a virtual SIM (vSIM), thus eliminating the need to check for an installed SIM in some implementations.

Figure 8:
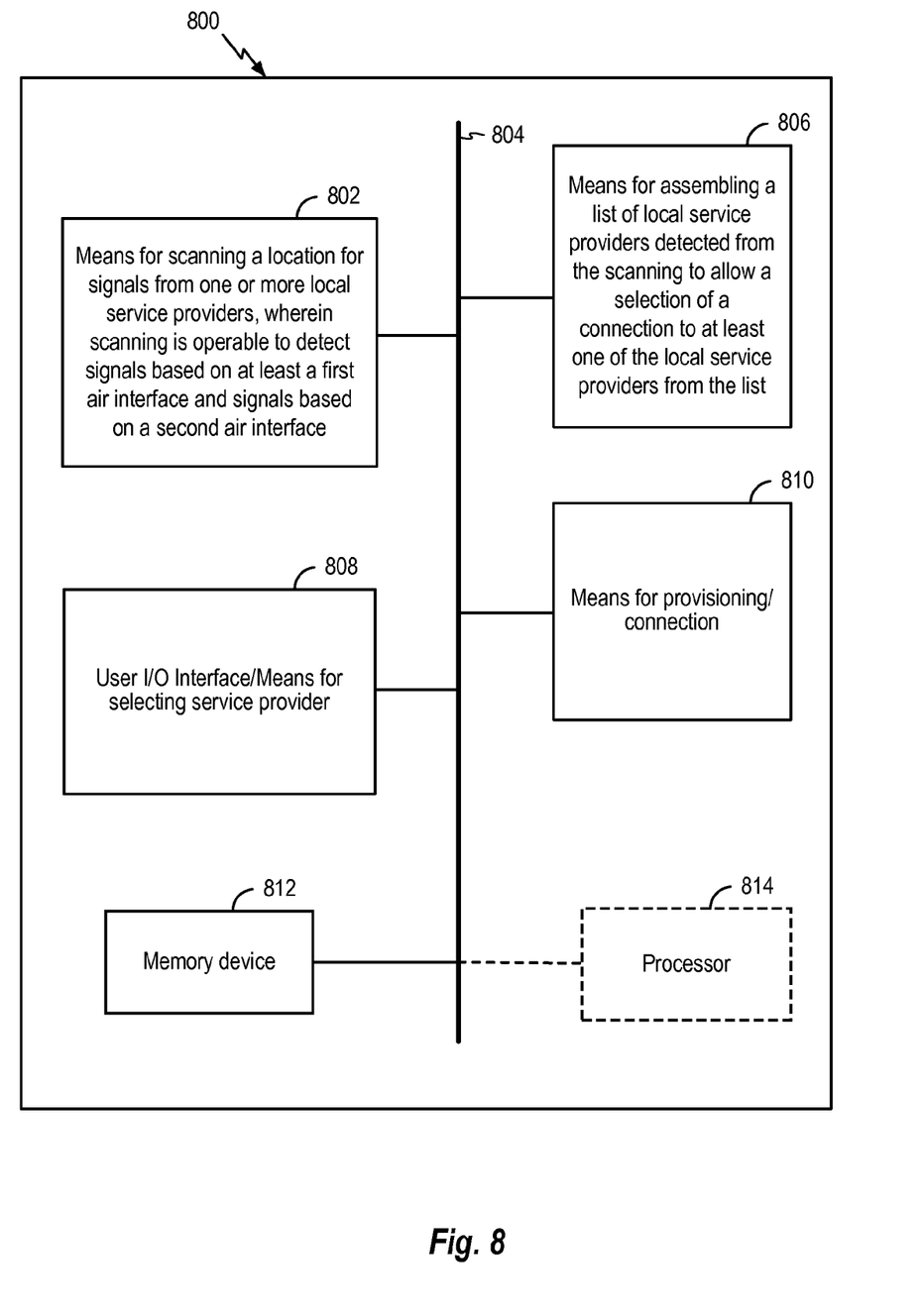
FIG. 8 illustrates another apparatus configured to scan for signals from multiple air interfaces.

FIG. 8 illustrates another apparatus 800 configured to scan for signals from multiple air interfaces. Apparatus 800 may be configured as a wireless device, such as a laptop or cell phone, or may be a portion of a wireless device, such as one or more chipsets, that implements the presently disclosed methods. The illustrated apparatus 800 includes a means 802 for scanning a location for signals from one or more local service providers, wherein scanning is operable to detect signals based on at least a first air interface and signals based on a second air interface. It is noted that means 802 may be implemented in one example by a modem comprised of at least an RF circuitry and a DSP (e.g., 202 and 206), as well as software and a user interface (e.g., 212) if needed. Results of the scanning by means 802 may be communicated to other modules or means in apparatus 800 via a communication coupling 804 illustrated merely as exemplary, and which may consist of a communication bus or similar communicative coupling means.

Apparatus 800 also includes means 806 for assembling a list of local service providers detected from the scanning to allow a selection of a connection to at least one of the local service providers from the list. Means 806 may be implemented, as merely one example, by a processor and a memory device, such as one or more of a DSP (206), general processor (208) and a memory or database (210).

Apparatus 800 may also include a User Input/output Interface or means for selecting a service provider 808, which may consist of one or more of, but not limited to, a keyboard, keypad, audio input, stylus, mouse, an audio output, a visual display, and associated couplings. Additionally, the interface may consist of software or firmware running on a processor to output and input data. Means 808 functions, in part, to allow a user to see the list of determined service providers determined by means 802 and receive a service provider selection from a user. Means 808 may also be utilized to allow a user to enter a present location and data concerning filtering of particular service providers as was discussed previously.

Furthermore, apparatus 800 may include a provisioning and connection module 810, which is comparable to the module 214 discussed before, in conjunction with a memory or database such as memory device 812 for storing scanning results and storing and reading out firmware related to at least CDMA provisioning. Apparatus also includes an alternate processor 814 that is used to execute other software and firmware stored in memory 812 for effecting the method of scanning among multiple air-interfaces and providing a result list of service providers to user for selection by the user.

In light of the foregoing discussion, one skilled in the art will appreciate that the presently disclosed methods and apparatus may be applied to any dual-mode or multi-mode device capable of connectivity via two or more air-interfaces, including UMTS, CDMA, OFDM technologies such as Wi-Fi, LTE, UMB, and WiMax, and W-CDMA. Additionally, one skilled in the art will appreciate that a second or further available network access technology that could be scanned or detected could include not only wireless technologies, but wired connections as well.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. A method of signal scanning for connection to a local service provider, the method comprising:
   determining the location where signal scanning is to occur;
   preparing a scan list that is limited to local service providers available at the determined location;
   scanning at the determined location only for signals from the local service providers in the scan list,
   wherein scanning is operable to detect signals based on at least a first air interface and signals based on a second air interface,
   wherein scanning includes first determining an order of scanning among the first and second air interfaces based on predefined filtering conditions which include preclusion of a search for air interface signals if there is no subscriber identity module (SIM) for acquiring the air interface signals; and
   assembling a detection list of local service providers detected from the scanning to allow a selection of a connection to at least one of the local service providers from the detection list.

2. The method as defined in claim 1, wherein scanning includes first determining an order of scanning among the first and second air interfaces and among local service providers using each air interface.

3. The method as defined in claim 2, wherein determining the order of scanning includes precluding search of particular service providers and air interfaces based on predefined filtering conditions.

4. The method as defined in claim 1, wherein each of the first and second air interfaces include one or more local service providers operating according to that particular air interface.

5. The method as defined in claim 1, wherein the first air interface is UMTS and the second air interface is CDMA.

6. The method as defined in claim 1, further comprising:
   initiating connection with a selected local service provider selected from the detection list of local service providers.

7. The method as defined in claim 6, wherein when the selected local service provider is a provider using CDMA air interface, initiating connection further comprises:
   accessing provisioning firmware particular to the selected local service provider from a database that is operable for connection to the particular selected local service provider.

8. The method as defined in claim 1, wherein the first air interface is UMTS and the scanning for local service providers operating with UMTS includes performing one of a standard GSM manual search of one or more local UMTS service providers according to the GSM standard.

9. The method as defined in claim 1, wherein the first air interface is CDMA and the scanning for local service providers operating with CDMA includes accessing a database storing information for each respective local CDMA service provider, wherein the information is operable to allow a user device to at least detect signals from a respective CDMA service provider.

10. An apparatus for signal scanning for connection to a local service provider, the apparatus comprising:
at least one processor configured to:
determine a location where scanning is to occur;
prepare a scan list that is limited to local service providers available at the determined location;
scan at the determined location only for signals from the local service providers in the scan list, wherein the scanning is operable to detect signals based on at least a first air interface and signals based on a second air interface, and wherein the scanning includes first determining an order of scanning among the first and second air interfaces based on predefined filtering conditions which include preclusion of a search for air interface signals if there is no subscriber identity module (SIM) for acquiring the air interface signals; and
assemble a detection list of local service providers detected from the scanning to allow a selection of a connection to at least one of the local service providers from the detection list; and
a memory coupled to the at least one processor.

11. The apparatus as defined in claim 10, wherein the at least one processor is further configured to scan by first determining an order of scanning among the first and second air interfaces and among local service providers using each air interface.

12. The apparatus as defined in claim 11, wherein the at least one processor is further configured to determine the order of scanning by precluding search of particular service providers and air interfaces based on predefined filtering conditions.

13. The apparatus as defined in claim 10, wherein each of the first and second air interfaces include one or more local service providers operating according to that particular air interface.

14. The apparatus as defined in claim 10, wherein the first air interface is UMTS and the second air interface is CDMA.

15. The apparatus as defined in claim 10, wherein the at least one processor is further configured to initiate connection with a selected local service provider selected from the detection list of local service providers.

16. The apparatus as defined in claim 15, wherein when the selected local service provider is a provider using CDMA air interface, initiating connection further comprises:
accessing provisioning firmware particular to the selected local service provider from a database that is operable for connection to the particular selected local service provider.

17. The apparatus as defined in claim 10, wherein the first air interface is UMTS and the scanning for local service providers operating with UMTS includes performing one of a standard GSM manual search of one or more local UMTS service providers according to the GSM standard.

18. The apparatus as defined in claim 10, wherein the first air interface is CDMA and the scanning for local service providers operating with CDMA includes accessing a database storing information for each respective local CDMA service provider, wherein the information is operable to allow a user device to at least detect signals from a respective CDMA service provider.

19. An apparatus for signal scanning for connection to a local service provider, the apparatus comprising:
means for determining a location where signal scanning is to occur, and for preparing a scan list that is limited to local service providers available at the determined location, and for scanning at the determined location only for signals from the local service providers in the scan list, wherein the scanning is operable to detect signals based on at least a first air interface and signals based on a second air interface, and wherein the scanning includes first determining an order of scanning among the first and second air interfaces based on predefined filtering conditions which include preclusion of a search for air interface signals if there is no subscriber identity module (SIM) for acquiring the air interface signals; and
means for assembling a detection list of local service providers detected from the scanning to allow a selection of a connection to at least one of the local service providers from the detection list.

20. The apparatus as defined in claim 19, wherein the means for scanning includes means for determining an order of scanning among the first and second air interfaces and among local service providers using each air interface.

21. The apparatus as defined in claim 20, wherein the means for determining an order is further configured to determine the order of scanning by precluding search of particular service providers and air interfaces based on predefined filtering conditions.

22. The apparatus as defined in claim 19, wherein each of the first and second air interfaces include one or more local service providers operating according to that particular air interface.

23. The apparatus as defined in claim 19, wherein the first air interface is UMTS and the second air interface is CDMA.

24. The apparatus as defined in claim 19, further comprising:
means for initiating connection with a selected local service provider selected from the detection list of local service providers.

25. The apparatus as defined in claim 24, wherein when the selected local service provider is a provider using CDMA air interface, initiating connection further comprises:
accessing provisioning firmware particular to the selected local service provider from a database that is operable for connection to the particular selected local service provider.

26. The apparatus as defined in claim 19, wherein the first air interface is UMTS and the scanning for local service providers operating with UMTS includes performing one of a standard GSM manual search of one or more local UMTS service providers according to the GSM standard.

27. The apparatus as defined in claim 19, wherein the first air interface is CDMA and the scanning for local service providers operating with CDMA includes accessing a database storing information for each respective local CDMA service provider, wherein the information is operable to allow a user device to at least detect signals from a respective CDMA service provider.

28. A computer program product, comprising:
a non-transitory computer-readable medium comprising:
code for causing a computer to determine a location where signal scanning is to occur, to prepare a scan list that is limited to local service providers available at the determined location, and to scan at the determined location only for signals from the local service providers in the scan list for connection of a user device to a local service provider, wherein the scanning is operable to detect signals based on at least a first air interface and signals based on a second air interface, and wherein the scanning includes first determining an order of scanning among the first and second air interfaces based on predefined filtering conditions which include preclusion of a search for air interface signals if there is no subscriber identity module (SIM) for acquiring the air interface signals; and code for causing a computer to assemble a detection list of local service providers detected from the scanning to allow a selection of a connection to at least one of the local service providers from the detection list.

29. The computer program product as defined in claim 28, wherein code for causing a computer to scan includes code for causing a computer to first determine an order of scanning among the first and second air interfaces and among local service providers using each air interface.

30. The computer program product as defined in claim 29, wherein code for causing a computer to determine the order of scanning includes code for causing a computer to preclude search of particular service providers and air interfaces based on predefined filtering conditions.

31. The computer program product as defined in claim 28, wherein each of the first and second air interfaces include one or more local service providers operating according to that particular air interface.

32. The computer program product as defined in claim 28, wherein the first air interface is UMTS and the second air interface is CDMA.

33. The computer program product as defined in claim 28, the non-transitory computer-readable medium further comprising:

code for causing a computer to initiate connection with a selected local service provider selected from the detection list of local service providers.

34. The computer program product as defined in claim 33, wherein when the selected local service provider is a provider using CDMA air interface, initiating connection further comprises:

accessing provisioning firmware particular to the selected local service provider from a database that is operable for connection to the particular selected local service provider.

35. The computer program product as defined in claim 28, wherein the first air interface is UMTS and the scanning for local service providers operating with UMTS includes performing one of a standard GSM manual search of one or more local UMTS service providers according to the GSM standard.

36. The computer program product as defined in claim 28, wherein the first air interface is CDMA and the scanning for local service providers operating with CDMA includes accessing a database storing information for each respective local CDMA service provider, wherein the information is operable to allow a user device to at least detect signals from a respective CDMA service provider.

* * * * *